April 28, 1931.   R. B. OTWELL   1,802,669
HEATER FOR MOTOR DRIVEN VEHICLES
Filed Dec. 29, 1928   2 Sheets-Sheet 1
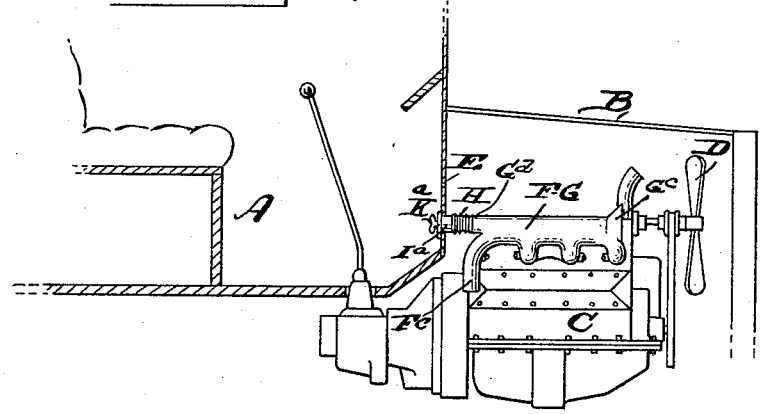
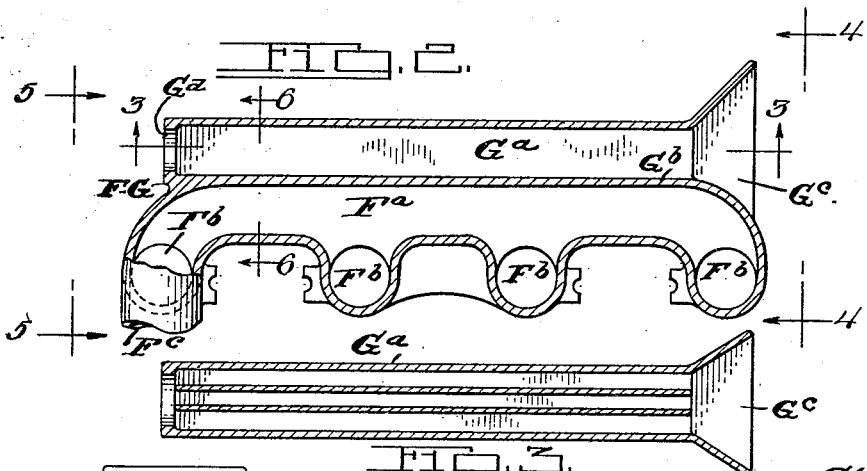
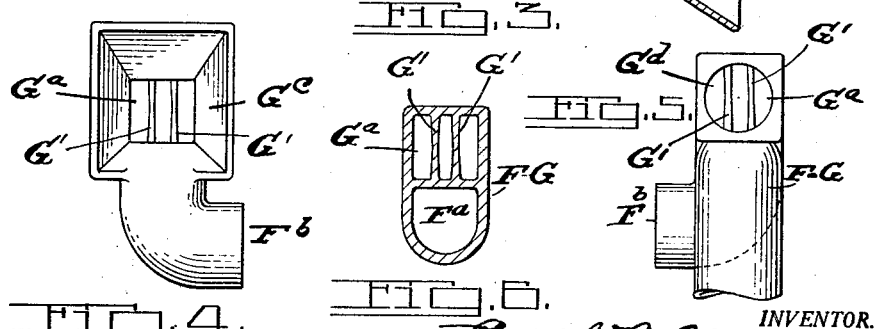
INVENTOR.
Ralph B Otwell
BY S. E. Thomas
ATTORNEYS.

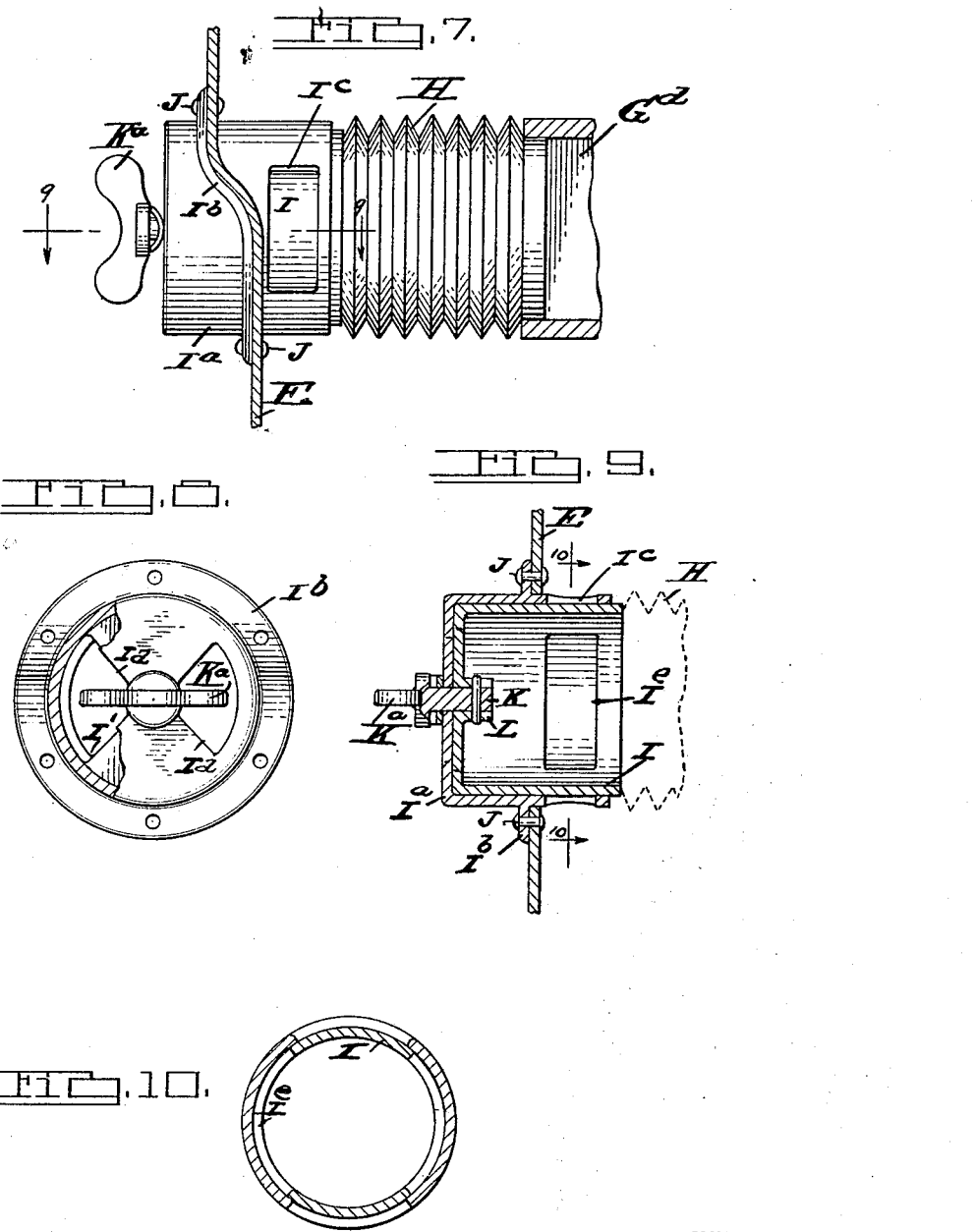

Patented Apr. 28, 1931

1,802,669

UNITED STATES PATENT OFFICE

RALPH B. OTWELL, OF DETROIT, MICHIGAN

HEATER FOR MOTOR-DRIVEN VEHICLES

Application filed December 29, 1928. Serial No. 329,151.

My invention relates to a heater for motor-driven vehicles, shown in the accompanying drawings and more particularly described in the following specification and claim.

Heating devices for motor vehicles have been constructed of sheet metal mounted upon the exhaust pipes and manifolds of internal combustion engines, the heater being connected by suitable piping with the body of the vehicle.

Heating devices of this type however have been very unsatisfactory because the several parts soon become loose and rattle and furthermore the radiating surface is not sufficient to properly heat the vehicle.

It is therefore the purpose of the present invention to overcome these and other objections to the devices now in use by providing a heater integral with the exhaust manifold of the engine, wherein the heating chamber is aligned with and extends substantially the entire length of the exhaust manifold,—being separated from the latter by a single wall through which the heat of the exhaust gases readily pass.

Another object of the invention is to increase the radiating surface of the device by providing the heating chamber with a plurality of longitudinally disposed partition walls, spaced apart and extending the length of the heating chamber.

Another feature of the device consists in providing the forward end of the heater with a funnel-shaped opening to receive pure fresh air, forced by the fan over the several highly heated wall surfaces comprising the heating chamber on its passage to the body of the vehicle.

Another feature of the invention consists in the controlling valve of the heater which is so positioned on the dash-board that the driver has the delivery of heated air into the vehicle under his control at all times;— the valve being so constructed that the heated air is either delivered directly into the body of the vehicle and automatically cut-off from being discharged into the open air, or when cut-off from the vehicle is automatically discharged under the hood of the vehicle, or elsewhere as desired.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a fragmentary diagrammatical elevation with parts in section of an automobile and its power plant showing the heating device installed therein.

Figure 2 is a longitudinal vertical sectional view through the heating device and its integral exhaust manifold.

Figure 3 is a horizontal longitudinal sectional view taken on or about line 3—3 of Figure 2.

Figure 4 is an elevation of the forward or funnel end the combined heater and exhaust manifold, viewed from the direction indicated by the arrows on line 4—4 of Figure 2.

Figure 5 is an end elevation of the device as indicated by the arrows on line 5—5 of Figure 2,—showing a portion of the exhaust pipe broken away.

Figure 6 is a cross-sectional view of the device taken on or about line 6—6 of Figure 2.

Figure 7 is a fragmentary plan of a detail, showing the controlling valve of the device attached to the dash, also the flexible pipe connection between the valve and the heater.

Figure 8 is a front elevation of the valve with parts broken away and in section.

Figure 9 is a vertical longitudinal sectional view of the valve, taken on or about line 9—9 of Figure 7.

Figure 10 is a cross-sectional view through the valve, taken on or about line 10—10 of Figure 9.

Referring now to the letters of reference placed upon the drawings:

A denotes a motor driven vehicle, B its hood, C the engine, D the usual fan and E the dash-board of the vehicle.

F—G indicates a combined exhaust manifold and heater, in which $F^a$ is the exhaust chamber and $F^b$ the ports opening into the exhaust chamber and $F^c$ the discharge outlet therefrom.

$G^a$ denotes the heating chamber, the wall $G^b$, being an integral part of both chambers and serving to quickly conduct the heat from the exhaust gases in the manifold into the heating chamber that the temperature of the air passing through the latter may be raised.

$G^c$ indicates a funnel-shaped opening at the forward end of the heater,—which due to its location adjacent the fan D receives and directs the air to the heating chamber.

$G^d$ denotes a discharge opening at the opposite end of the heating chamber.

$G^1$ indicates a plurality of longitudinal partition walls spaced apart extending the entire length of the heating chamber, between which the air passes and is quickly heated on its way to the car body.

H denotes a flexible pipe of bellows-like form connecting the discharge end $G^d$ of the heater with the body of a controlling valve governing the delivery of the heated air into the vehicle.

I denotes the controlling sleeve valve fitted within a body $I^a$ having a flange $I^b$, pierced with holes to receive rivets or bolts J, to secure the valve to the dash E of the vehicle —see Figure 7.

The forward end of the valve body projects through the dash E under the hood B, and has ports $I^c$, for the discharge of the heated air outside the body of the vehicle.

The inner closed end of the valve body is provided with segmental openings $I^d$ through which the heated air passes to the vehicle to heat the latter.

The controlling valve sleeve I is mounted upon the forward end of a shank K journalled in the valve body, said shank being mounted in the boss L of the valve sleeve I and secured therein by a suitable fastening L'. Secured to the rear end of the shank is a wing lever $K^a$ for manually rotating the valve.

The cup-shaped sleeve valve I, provided with segmental openings $I^1$ in its end wall are adapted to register with the openings $I^d$ in the wall of the valve body, upon manually rotating the wing lever.

The valve sleeve is also provided with openings $I^e$, which register with the ports $I^c$ discharging beneath the hood, upon turning the wing lever. It being noted that when the ports $I^e$ are opened, the ports $I^1$ are closed, and vice versa.

Having indicated the several parts by reference letters, the construction and operation of the device will be readily understood.

When it is desired to heat the body of the vehicle the cup-shaped sleeve valve I is turned so that its opening $I^1$ will register with the openings $I^d$ in the valve body, whereupon the incoming fresh air, forced by the fan D through the heating chamber into the vehicle body is heated during its passage through the heater by the gases in the adjacent exhaust manifold.

When it is desired to cut off the heat from the body of the vehicle, the wing lever is turned to close against the delivery of heated air to the body of the vehicle, the heated air is then discharged through the openings $I^e$ and ports $I^c$ under the hood as previously explained.

It will be noted that the above design eliminates any possibility of the exhaust gases entering the car body through the heater.

Having thus described my invention what I claim is:

A device of the character described, comprising a combined exhaust manifold and an air heating chamber constructed of cast iron with the heating chamber disposed entirely on top the exhaust manifold and the walls of both being of uniform thickness and coinciding throughout and each having the same internal cross sectional diameter, the air heating chamber being rectangular in cross section and open at each end and having a plurality of vertically disposed longitudinal partitions therein extending from top to bottom of the heating chamber and forming a series of relatively narrow air passages entirely unobstructed from one end to the other to permit free passage of air, the outer longitudinal air passages and the air flowing therethrough protecting the intermediate air passage to maintain the air flowing through the intermediate passage out of direct contact with the outer side walls of the air chamber to thereby maintain a higher temperature for the air in the intermediate passage than that afforded the air in the outer passages.

In testimony whereof, I sign this specification.

RALPH B. OTWELL.